US012267917B2

(12) United States Patent
Almodovar Chico et al.

(10) Patent No.: US 12,267,917 B2
(45) Date of Patent: Apr. 1, 2025

(54) DETERMINING WHEN TO RELAY A DATA UNIT IN A CELLULAR COMMUNICATION NETWORK

(71) Applicants: KONINKLIJKE KPN N.V., Rotterdam (NL); NEDERLANDSE ORGANNEDERLANDSE ORGANISATIE VISATIE VOOR TOEGEPAST NATUURWETENSCHAPPELIJK ONDERZOEK TNO, 's-Gravenhage (NL)

(72) Inventors: Jose Almodovar Chico, The Hague (NL); Erwin Willem Middelesch, The Hague (NL); Sander De Kievit, Tokyo (JP); Toni Dimitrovski, The Hague (NL); Miodrag Djurica, Rotterdam (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 18/108,371

(22) Filed: Feb. 10, 2023

(65) Prior Publication Data
US 2023/0199913 A1 Jun. 22, 2023

Related U.S. Application Data

(63) Continuation of application No. 16/954,834, filed as application No. PCT/EP2018/086472 on Dec. 21, 2018, now Pat. No. 11,617,225.

(30) Foreign Application Priority Data

Dec. 21, 2017 (EP) .................................... 17209213

(51) Int. Cl.
*H04W 76/14* (2018.01)
*H04L 41/0816* (2022.01)
(Continued)

(52) U.S. Cl.
CPC ......... *H04W 88/04* (2013.01); *H04L 41/0816* (2013.01); *H04W 8/005* (2013.01);
(Continued)

(58) Field of Classification Search
None
See application file for complete search history.

(56) References Cited

U.S. PATENT DOCUMENTS 10,455,479 B2   10/2019  Seo
2006/0040616 A1   2/2006  Wheatley
(Continued)

FOREIGN PATENT DOCUMENTS

EP        3121974      1/2017
WO   2016136171     9/2016

OTHER PUBLICATIONS

The International Search Report (ISR) with Written Opinion for PCT/EP2018/086472 dated Mar. 12, 2019, pp. 1-13.
(Continued)

*Primary Examiner* — Robert M Morlan
(74) *Attorney, Agent, or Firm* — McDonnell Boehnen Hulbert & Berghoff LLP

(57) ABSTRACT

The system (1) of the invention is configured to receive information relating to relay devices (11, 17-19) present in a certain spatial area and determine relay configuration information for the relay devices from the information. The relay configuration information instructs the relay devices when to receive and/or relay data units and when not to receive and/or relay data units. The system is further configured to transmit the relay configuration information to the (Continued)

relay devices. The relay device of the invention is configured receive a data unit from a further device (21) or not in dependence on the received relay configuration information and/or relay a received data unit to the cellular communication network (31) or not in dependence on the received relay configuration information.

21 Claims, 10 Drawing Sheets

(51) Int. Cl.
    *H04W 8/00*     (2009.01)
    *H04W 40/00*     (2009.01)
    *H04W 40/02*     (2009.01)
    *H04W 88/04*     (2009.01)

(52) U.S. Cl.
    CPC ......... *H04W 40/005* (2013.01); *H04W 40/02* (2013.01); *H04W 76/14* (2018.02)

(56) References Cited

U.S. PATENT DOCUMENTS

| | | | |
|---|---|---|---|
| 2012/0252354 A1 | 10/2012 | Itoh et al. | |
| 2014/0192705 A1* | 7/2014 | Ayadurai | H04B 7/15507 370/315 |
| 2015/0072696 A1* | 3/2015 | Nakata | H04W 72/51 455/450 |
| 2017/0026162 A1 | 1/2017 | Nabetani et al. | |
| 2017/0347338 A1* | 11/2017 | Chen | H04W 72/30 |

OTHER PUBLICATIONS

European Search Report for EP 17209213 dated May 9, 2018, pp. 1-2.
ETSI TS 123 002 V12.5.0 (Oct. 2014) Digital cellular telecommunications systems (Phase 2+); Universal Mobile Telecommunications Systems (UMTS); LTE; Network architecture (3GPP TS 23.002 version 12.5.0 Release 12).
ETSI TS 123 303 V12.2.0 (Sep. 2014) Universal Mobile Telecommunications Systems (UMTS); LTE; Proximity-based services (ProSe); Stage 2 (3GPP TS 23.303 version 12.2.0 Release 12).
ETSI TS 123 401 V12.6.0 (Sep. 2014) LTE; General Packet Radio Service (GPRS) enhancements for Evolved Universal Terrestrial Radio Access Network (E-UTRAN) access (3GPP TS 23.401 version 12.6.0 Release 12).
L.C. Pond and V.O.K. Li, "A distributed time-slot assignment protocol for mobile multi-hip broadcast packet radio networks," IEEE Military Communications Conference, 'Bridging the Gap. Interoperability, Survivability, Security', 1989, pp. 70-74 vol. 1m doi: 10.1109/MILCOM.1989.103901.
Performance Comparison of Broadcasting Methods in Mobile Ad Hoc Network, N. Karthikeyan, Dr. V. Palanisamy, and Dr. K. Duraiswamy, International Journal of Future Generation Communication and Networking, vol. 2, No. 2, Jun. 2009.
Chinese Office Action in Chinese, patent application No. 201880081918.X, issued Aug. 1, 2022.

* cited by examiner

DETERMINING WHEN TO RELAY A DATA UNIT IN A CELLULAR COMMUNICATION NETWORK

CROSS REFERENCE TO RELATED APPLICATIONS

The present application is a continuation of, and claims priority to, U.S. patent application Ser. No. 16/954,834, filed Jun. 17, 2020, which is a national stage entry of, and claims priority to, PCT/EP2018/086472, filed on Dec. 21, 2018, which claims priority to European Patent Application EP 17209213.2, filed in the European Patent Office on Dec. 21, 2017, all three of which are hereby incorporated in their entirety herein by reference.

FIELD OF THE INVENTION

The invention relates to a device for relaying a data unit, a system for determining a relay configuration and a device for broadcasting data units to be relayed.

The invention further relates to a method of relaying a data unit, a method of determining a relay configuration and a method of broadcasting data units to be relayed.

The invention also relates to a computer program product enabling a computer system to perform such methods.

BACKGROUND OF THE INVENTION

Proximity Services (ProSe; 3GPP TS 23.303) is the name of the group of services used in LTE Mobile Networks to discover and communicate between user equipments (UEs) that are in proximity to one another. Proximity Services is a mechanism developed by 3GPP that allows a direct connection to be established between two UEs via an interface called PC5. Currently, ProSe has been commercialized only for Public Safety use cases. One such use case is known as the out of coverage use case. In this use case, the UEs of certain emergency responders are out of coverage of the mobile network. For example, when a squad of firemen attempts to extinguish a fire in a building and the fire is in the basement, the UEs of some firemen may not have coverage. These UEs will then proceed to establish a ProSe connection with the UEs of other firemen to get their data relayed and still have connectivity.

However, 3GPP has already started standardizing in Release 14 the use of 3GPP ProSe for commercial use cases beyond Public Safety, which will be especially interesting for wearables like smart watches, step counters and fitness trackers. Currently, fitness trackers like the NIKE+ and Fitbit typically use Bluetooth to pair to a mobile phone. Collected data is sent via Bluetooth to an application running on the mobile phone, which can then send it further on to a server in the network via a cellular communication network. Effectively, the connection is permanent and it has two distinct parts: wearable to mobile phone and mobile phone to the Internet.

A UE that relays its data through another device is generally referred to as a remote UE. The other device, which acts as relay to the cellular communication network, is generally referred to as relay UE. There are several reasons why a remote UE may want or need to relay data through relay UEs (e.g. power conservation, no capability of connecting to a cellular communication network directly, etc.).

In the case of wearables (e.g. a fitness tracker), only small amounts of data are transmitted. Furthermore, wearables often don't have the capability of connecting to a cellular communication network directly and therefore need to have their traffic relayed. When a person wearing a wearable is carrying an own mobile phone while running, he will normally pair the wearable and the mobile phone in order to have the mobile phone relay data from the wearable to the communication network. However, pairing is not always possible or advisable, e.g. when a person wearing a wearable is running and forgot his own mobile phone or forgot to charge his mobile phone. In this situation, the wearable needs to transmit its data via different mobile phones of other persons. Pairing a wearable to a particular mobile phone in order to transmit only a small amount of data is not resource efficient. Bluetooth is thus not ideally suited to be used in this situation. Bluetooth does reduce the number of collisions by employing frequency hopping. Not all wireless standards, e.g. the PC5 interface used in ProSe, implement a collision detection mechanism and this may cause loss of data.

SUMMARY OF THE INVENTION

It is a first object of the invention to provide a device for relaying a data unit, which can relay data for another device without establishing a connection or pairing with the other device.

It is a second object of the invention to provide a system for determining a relay configuration, which allows a first device to relay data for a second device without establishing a connection between or pairing the two devices.

It is a third object of the invention to provide a device for broadcasting data units to be relayed, which can relay data via another device without establishing a connection or pairing with the other device.

It is a fourth object of the invention to provide a method of relaying a data unit, which allows a device to relay data for another device without establishing a connection or pairing with the other device.

It is a fifth object of the invention to provide a method of determining a relay configuration, which allows a first device to relay data for a second device without establishing a connection between or pairing the two devices.

It is a sixth object of the invention to provide a method of broadcasting data units to be relayed, which allows a device to relay data via another device without establishing a connection or pairing with the other device.

According to the invention, the first object is realized in that the device for relaying a data unit comprises at least one receiver, at least one transmitter, and at least one processor configured to use said at least one receiver to receive relay configuration information from a cellular communication network, said relay configuration information instructing said device when to receive and/or relay data units and when not to receive and/or relay data units, and determine a relay time window for receiving data units from said relay configuration information. Said at least one processor is further configured to use said at least one receiver to receive a data unit from a further device or not in dependence on said relay configuration information and/or use said at least one transmitter to relay, i.e. pass on, a received data unit to said cellular communication network or not in dependence on said relay configuration information.

For example, said at least one processor may be configured not to receive data units at certain times (and thus not to relay these data units) or to receive data units all the time, but not to relay all received data units. A data unit may comprise user data or control data, for example. A data unit may be, for example, a message, e.g. a control message. The device may be a relay UE and the further device may be a remote UE, for example.

The inventors have recognized that by having the remote UE broadcast data that needs to be relayed with the intention and expectation that at least one relay UE is going to receive and relay it (pass it onwards) to a server in the network, no connection needs to be established. The remote UE that broadcasts the data to be relayed operates in a mode that is referred to in this patent specification as "quick-encounter mode".

However, without additional measures, this solution would not scale well. A large number of relay UEs receiving the same data unit results in duplication of data units because multiple relay UEs would normally relay the same data unit to the network. By having the network determine, i.e. decide on, relay configuration information which instructs relay UEs when to receive and/or relay data units and when not to receive and/or relay data units and have relay UEs comply with this relay configuration information (transmitted to them by the network), the number of duplicate data units may be reduced, thereby resulting in an efficient use of network resources.

Said at least one processor may be configured to determine a relay time window for receiving data units from said relay configuration information and use said at least one receiver to listen for data units in said relay time window and not listen for data units in a further time window outside said relay time window. By not listening for data units in the further time window, the number of duplicate data units may be decreased.

Said at least one processor may be configured to decide whether or not to relay said received data unit in dependence on a relay time window, a signal strength threshold and/or a relaying probability determined from said relay configuration information. A relay time window, a signal strength threshold and a relay probability all allow the at least one processor to determine when to receive and/or relay data units and when not to receive and/or relay data units and may thereby decrease the number of duplicate data units. The relay probability is the probability with which the device relays a particular received data unit. For example, if the relay probability is 0.25, the goal is to have on average 1 out of each 4 received data units relayed.

Said at least one processor may be configured to use said at least one transmitter to relay said data unit to said cellular communication network if said data unit was received in said relay time window and not relay said data unit if said data unit was received in a further time window outside said relay time window. This is beneficial when different priorities are assigned to different remote UEs or to different slices transmitted by remote UEs. For example, data units from certain high priority UEs (e.g. used for ensuring public safety) may be relayed at all times (thereby overruling the relay time window for these UEs), while data units from regular UEs may not be relayed in the further time window (thereby conforming to the relay time window) in order to decrease the number of duplicate data units.

Said at least one processor may be configured to receive said data unit from said further device in a signal at a reception signal strength, use said at least one transmitter to relay said data unit to said cellular communication network if said reception signal strength is stronger than said signal strength threshold and not relay said data unit to said cellular communication network if said reception signal strength is weaker than said signal strength threshold. As a result, only the one or more relay UEs which are closest to the remote UE will relay the data unit broadcast by the relay UE. The signal strength may thus be used to reduce the number of relayed data units with the goal of reducing the number of duplicate data units (data units received in a weak signal are dropped, even though the signal was not weak enough to cause the data unit to be lost). As additional benefit, the relay UE saves battery power, because it only needs to decode data units that are received in a sufficiently strong signal, which can be decoded without any or without many errors. The signal strength threshold may be increased or decreased depending on the number of duplicate data units detected by the network.

Said at least one processor may be configured to determine whether to use said at least one transmitter to relay said data unit to said cellular communication network or not by applying said relaying probability. By arranging that each relay device relays only a certain percentage of the received data units, probabilities may thus be used to reduce the number of relayed data units with the goal of reducing the number of duplicate data units. The relaying probability may be increased or decreased depending on the number of duplicate data units detected by the network. The same relaying probability may be given to each relay UE in the same spatial area, or different relay UEs may be given different relaying probabilities, for example. In the latter case, the relaying probability may depend on the battery levels of the relay UEs and/or the network rate supported by the relay UEs, for example. The relay UEs may transmit this information to the network.

According to the invention, the second object is realized in that the system for determining a relay configuration comprises at least one receiver, at least one transmitter, and at least one processor configured to use said at least one receiver to receive information relating to relay devices present in a certain spatial area, determine relay configuration information for said relay devices from said information, said relay configuration information instructing said relay devices when to receive and/or relay data units and when not to receive and/or relay data units, and use said at least one transmitter to transmit said relay configuration information to said relay devices. Said system may receive said information automatically or on request. Said spatial area may be a cell or a part of a cell, for example.

Said at least one processor may be configured to determine from said information how many relay devices are present in said certain spatial area and determine said relay configuration information for said relay devices based on how many relay devices are present in said certain spatial area. Determining how many relay devices are present in said certain spatial area may comprise determining a number of relay UEs per cell or a density of relay UEs at a given location, for example. The more relay devices are present in said certain spatial area, the less time a relay device should spend on average on relaying data units in order to limit the number of duplicate data units. Alternatively or additionally, the at least one processor may be configured to determine the relay configuration information for a relay device from the type of location the relay device is in and/or from the battery level of the relay device.

Said relay configuration information may comprise a start time and an end time for listening for and/or relaying data units, comprise information instructing a relay device to start listening for and/or relaying data units immediately, comprise a signal strength threshold above which said relay device should relay a data unit and below which said relay device should not relay said data unit and/or comprise a relaying probability which said relay device should apply to determine whether to relay said data unit or not, for example. Additionally or alternatively, said relay configuration information may include other information.

Said at least one processor may be configured to determine said relay configuration information for said relay devices based on a count of duplicate data units originating from said certain spatial area. By adjusting the relay configuration information based on feedback, it is possible to adapt to changing circumstances quickly. The number of duplicate data units may be counted by a newly introduced function in the network, for example. This function may also remove duplicate data units after having counted them. If the relay UE uses a signal strength threshold, the relay UE may periodically provide as feedback to the network how many data units were received in signals that had a signal strength lower than the threshold. This allows the network to increase the signal strength threshold when too many duplicate data units are counted and decrease the signal strength threshold when too few duplicate data units are counted and/or too many data units were received in signals with a signal strength lower than the threshold (and therefore dropped), for example.

Said at least one processor may be configured to determine said relay configuration information for said relay devices based on a difference between a desired number of duplicate data units originating from said certain spatial area and a count of duplicate data units originating from said certain spatial area. For example, by setting the desired number of duplicate data units to at least one, a more reliable relay performance may be achieved. The desired number of duplicate data units may be set to zero if reliability is not important. It may be possible to change the desired number of duplicate data units over time, e.g. to adapt the network to certain events like marathons.

According to the invention, the third object is realized in that the device for broadcasting data units to be relayed comprises at least one receiver, at least one transmitter, and at least one processor configured to use said at least one receiver to receive broadcast configuration information established by a cellular communication network, determine a transmission time window and/or a transmission power for broadcasting data units to be relayed from said broadcast configuration information, and use said at least one transmitter to broadcast said data units in said transmission time window and/or at said transmission power.

If it is possible to specify transmission time windows per remote UE and listening time windows are assigned to relay UEs, these listening time windows may be shortened (and the transmission time windows may be established based on these listening time windows) in order to reduce power consumption by the relay UEs.

Furthermore, the use of transmission time windows may reduce the number of transmission collisions. The transmission power may be increased to try to increase the number of duplicate data units (and thereby the reliability of the relay function). The transmission power may be decreased to try to decrease the number of duplicate data units.

According to the invention, the fourth object is realized in that the method of relaying a data unit comprises receiving relay configuration information from a cellular communication network, said relay configuration information instructing a device when to receive and/or relay data units and when not to receive and/or relay data units, and receiving a data unit from a further device or not in dependence on said relay configuration information and/or relaying, i.e. passing on, a received data unit to said cellular communication network or not in dependence on said relay configuration. Said method may be performed by software running on a programmable device. This software may be provided as a computer program product.

According to the invention, the fifth object is realized in that the method of determining a relay configuration comprises receiving information relating to relay devices present in a certain spatial area, determining relay configuration information for said relay devices from said information, said relay configuration information instructing said relay devices when to receive and/or relay data units and when not to receive and/or relay data units, and transmitting said relay configuration information to said relay devices. Said method may be performed by software running on a programmable device. This software may be provided as a computer program product.

According to the invention, the sixth object is realized in that the method of broadcasting data units to be relayed comprises receiving broadcast configuration information established by a cellular communication network, determining a transmission time window and/or a transmission power for broadcasting data units to be relayed from said broadcast configuration information, and broadcasting said data units in said transmission time window and/or at said transmission power. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving relay configuration information from a cellular communication network, said relay configuration information instructing a device when to receive and/or relay data units and when not to receive and/or relay data units, and receiving a data unit from a further device or not in dependence on said relay configuration information and/or relaying, i.e. passing on, a received data unit to said cellular communication network or not in dependence on said relay configuration.

A non-transitory computer-readable storage medium stores at least a second software code portion, the second software code portion, when executed or processed by a computer, being configured to perform executable operations comprising: receiving information relating to relay devices present in a certain spatial area, determining relay configuration information for said relay devices from said information, said relay configuration information instructing said relay devices when to receive and/or relay data units and when not to receive and/or relay data units, and transmitting said relay configuration information to said relay devices.

A non-transitory computer-readable storage medium stores at least a third software code portion, the third software code portion, when executed or processed by a computer, being configured to perform executable operations comprising: receiving broadcast configuration information established by a cellular communication network, determining a transmission time window and/or a transmission power for broadcasting data units to be relayed from said broadcast configuration information, and broadcasting said data units in said transmission time window and/or at said transmission power.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
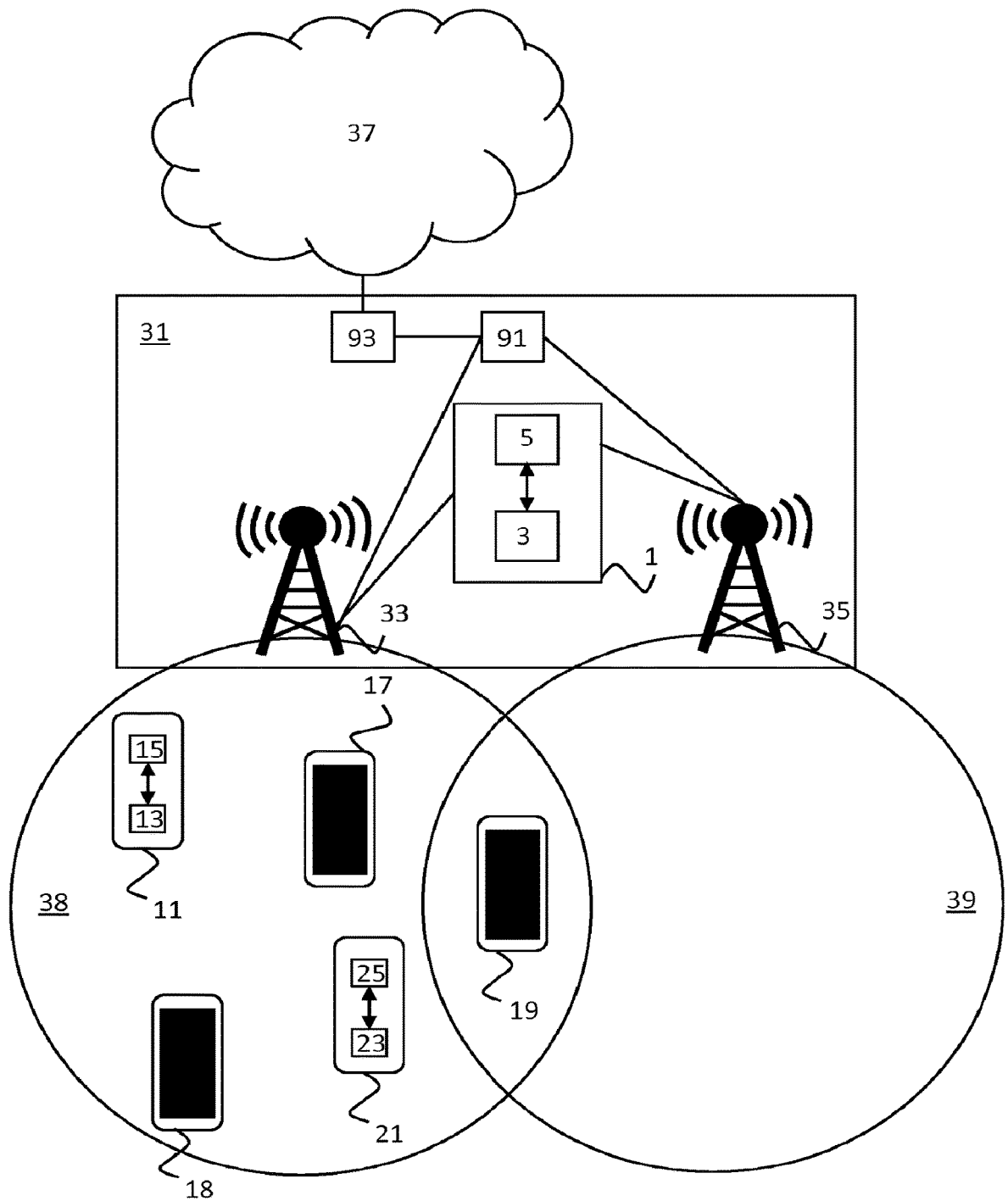
FIG. 1 is a block diagram of a first embodiment of the system and an embodiment of the devices of the invention.

FIG. 1 depicts a first embodiment of the system for determining a relay configuration of the invention. The system 1 comprises a transceiver 3 and a processor 5. The processor 5 is configured to use the transceiver 3 to receive information relating to relay devices (also referred to as "relay UEs") 11, 17-19 present in a certain spatial area, e.g. cell, and determine relay configuration information for the relay devices 11, 17-19 from the information. The relay configuration information instructs the relay devices 11, 17-19 when to receive and/or relay data units and when not to receive and/or relay data units from data producing devices (also referred to as "remote UEs") such as further device 21.

In the embodiment of FIG. 1, the system 1 instructs the relay devices 11, 17-19 when to receive data units and when not to receive data units and instructs the relay devices 11, 17-19 when to relay data units and when not to relay data units. In an alternative embodiment, the relay configuration information only instructs the relay devices 11, 17-19 when to receive data units and when not to receive data units or only instructs the relay devices 11, 17-19 when to relay data units and when not to relay data units.

The processor 5 is further configured to use the transceiver 3 to transmit the relay configuration information to the relay devices 11, 17-19. The system 1 is part of a cellular communication network 31. The relay devices 11, 17-19 communicate with other devices on the cellular communication network (e.g. mobile network) 31 and other devices on the Internet 37 via base station 33. The cellular communication network 31 comprises other base stations, e.g. base station 35, and other equipment typical for a cellular communication network. Relay devices 11, 17-19 and further device 21 are located in the cell coverage area 38 of the base station 33. The cellular communication network 31 further comprises a Serving Gateway (S-GW) 91 and a Packet Data Network Gateway (P-GW) 93. Relay device 19 is also located in the cell coverage area 39 of the base station 35.

FIG. 1 also depicts an embodiment of the device for relaying a data unit of the invention (also referred to as "relay device"). The relay device 11 comprises a transceiver 13 and a processor 15. The processor 15 is configured to use the transceiver 13 to receive the relay configuration information from the cellular communication network 31 and use the transceiver 13 to receive a data unit from the further device 21 or not in dependence on the relay configuration information and/or use the transceiver 13 to relay a received data unit to the cellular communication network 31 or not in dependence on the relay configuration information. The further device 21, also referred to as data producing device, comprises a transceiver 23 and a processor 25. The relay devices 17-19 comprise a transceiver and a processor configured in the manner described above in relation to relay device 11.

The relay device 11 may be configured to communicate with the further device 21 using 3GPP Proximity Services (ProSe) technology or an equivalent thereof. Conventional ProSe can be used to allow a remote UE and relay UE to discover each other. In this case, at least one of the UEs normally needs to announce itself and the other UE normally needs to discover these announcements. On the announcement, it can be specified which kind of UE it is (e.g. plain UE or Relay UE). Finally, once the discovery procedure has been performed and supervised by the network, the UEs establish a connection between them and can start communicating with each other. 3GPP also specifies support for ProSe Group communications and ProSe Broadcast communications between two or more UEs. Conventional ProSe may be enhanced for the purpose of implementing the invention.

Whether a mobile device's relay capability is turned on or off may be decided by the user of the mobile device or by a policy. As example of the latter, relaying may be turned off if the mobile device's battery is low (e.g. a policy set by the user or the network operator), turned off in 'busy' network hours (e.g. a policy set by the network operator) or turned off when roaming (e.g. a policy set by the user or network operator).

In the embodiment of FIG. 1, the processor 15 of the relay devices 11, 17-19 is configured to determine a relay time window (for receiving data units) from the relay configuration information and use the transceiver 13 to listen for data units in the relay time window and not listen for data units in a further time window outside the relay time window. The relay time window could be specified by a start and end time or a duration from the current time. The relay configuration information could identify a plurality of time periods, e.g. in a list or by means of a recurring pattern that is to be used by the relay device for the next time period. Such a recurring pattern could specify, for example, that the relay device should listen for data units xx:05 to xx:08 every hour between 10:00 and 14:00 today.

In addition, the relay configuration information may identify one or more conditions for the time windows. Conditions for a recurring pattern could be something like 'as long as you are connected to cell X' or 'as long as you are not deviating from your position more than y'. A possible reason for including such a condition is that the network could manage the areas in which relay devices relay data without causing too much signaling. Another possible reason is to conserve battery power for the relay devices, because they can stop relaying data units when the condition is no longer met.

In the embodiment of FIG. 1, each of the relay devices 11, 17-19 has been configured with a time window (each one getting its own time window) during which the relay device will receive and relay received data units. Whenever the further device 21 broadcasts a data unit during a configured time window in which a relay device is listening for data units, the relay device will relay it to the network 31. In the embodiment of FIG. 1, the relay devices 11, 17-19 will not listen for broadcasts from data producing devices (e.g. further device 21) outside the time window. In an alternative embodiment, the relay devices will listen for broadcasts all the time, but not relay the data units, e.g. messages, in these broadcasts if received outside the time window.

Figure 2:
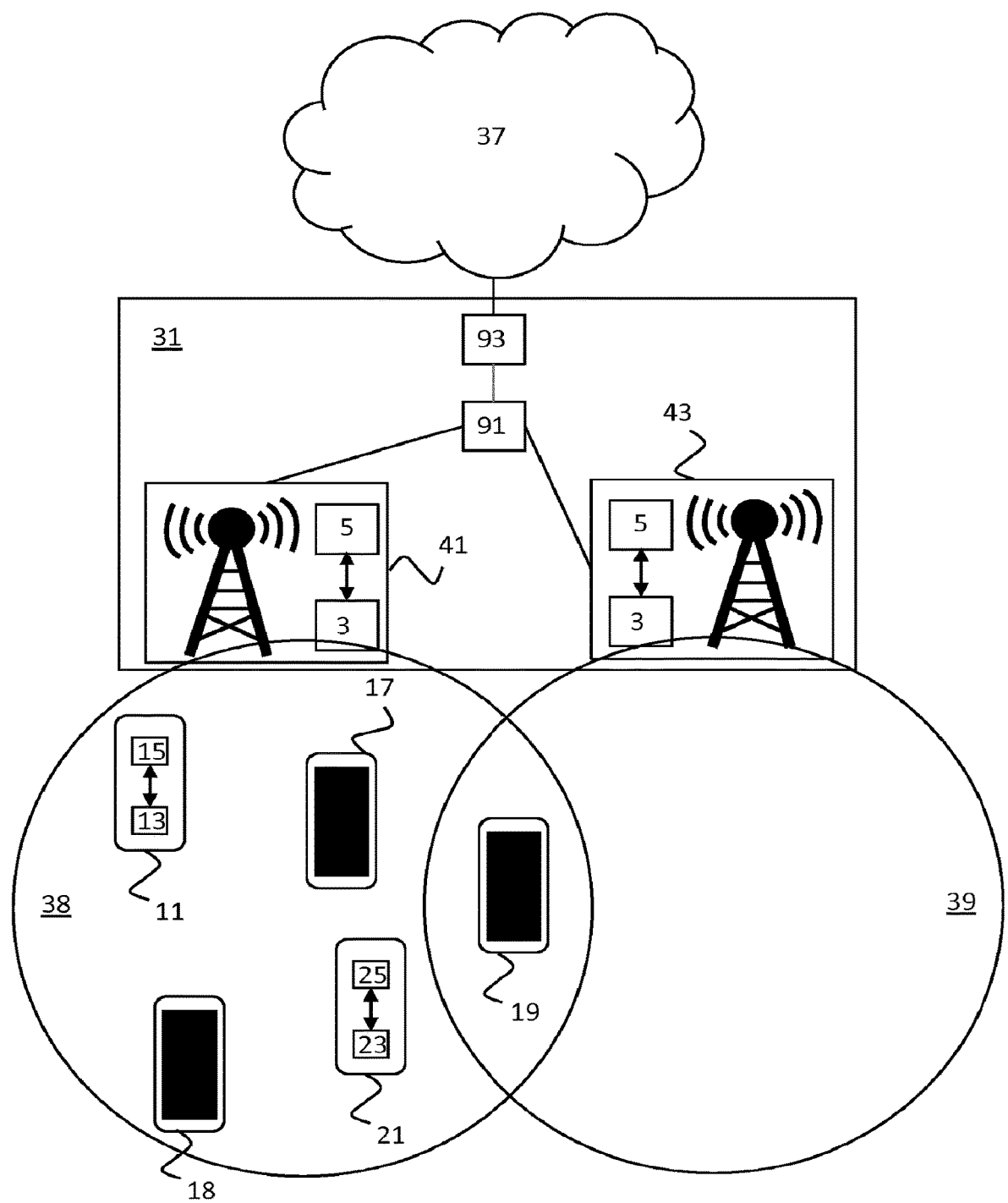
FIG. 2 is a block diagram of a second embodiment of the system and the devices of FIG. 1.

The network function of determining relay configuration information that allows the relay devices to determine time windows is referred to as Time Window Coordination Function (TWCF) in this document. This new Time Window Coordination Function could be implemented in system 1 separate from existing network functions, as shown in FIG. 1. Alternatively, the TWCF could be implemented in systems 41 and 43 collocated with other network functions, e.g. base stations like LTE eNBs, as shown in FIG. 2. In FIG. 1, the TWCF is centralized (e.g. one for the whole network 31 or one per larger group of base stations/eNBs). In FIG. 2, the TWCF is decentralized.

If the TWCF is decentralized, it could be collocated with eNBs in a standalone fashion (every TWCF performs time window scheduling for its own eNB) or in a distributed fashion (TWCFs collaborate with other TWCFs). If the TWCF is centralized, it sits at a higher level, e.g. at the level of the S-GW or MME or at an intermediate level, e.g. between the S-GW and the eNB. There may even be only one TWCF per network which coordinates for all eNBs belonging to the network. In FIG. 2, relay devices 11, 17-19 and further device 21 are located in cell coverage area 38 of base station 41 and relay device 19 is also located in cell coverage area 39 of base station 43.

In the embodiment of FIGS. 1 and 2, the processor 5 is configured to determine from information relating to relay devices 11, 17-19 present in the certain spatial area how many relay devices are present in the certain spatial area and determine the relay configuration information for the relay devices 11, 17-19 based on how many relay devices are present in the certain spatial area. Thus, the TWCF takes inputs (e.g. number of relay UEs per cell or relay UEs at a given location) and generates configurations for the relay devices 11, 17-19 from these inputs. The number of relay devices and/or other information relating to the relay devices could be collected from a ProSe server, communicated by a base station, estimated from historical data or given as manual input, for example. Alternatively or additionally, the TWCF may take the type of location the relay UE is in and/or the battery level of the relay UE as input(s).

As described above, the relay configuration information may comprise a start time and an end time for listening for and/or relaying data units and/or comprise information instructing a relay device to start listening for and/or relaying data units immediately. Alternatively or additionally, the relay configuration may comprise a signal strength threshold above which the relay device should relay a data unit and below which the relay device should not relay the data unit and/or comprise a relaying probability which the relay device should apply to determine whether to relay the data unit or not.

The processor 15 of the relay devices 11, 17-19 may be configured to decide whether or not to relay a received data unit in dependence on a) the relay time window, b) the signal strength threshold and/or c) the relaying probability determined from the relay configuration information. In particular, the processor 15 of the relay devices 11, 17-19 may be configured to:

a) use the transceiver 13 to relay the data unit to the cellular communication network 31 if the data unit was received in the relay time window and not relay the data unit if the data unit was received in a further time window outside the relay time window, and/or b) receive the data unit from the further device 21 in a signal at a reception signal strength, use the transceiver 13 to relay the data unit to the cellular communication network 31 if the reception signal strength is stronger than the signal strength threshold and not relay the data unit to the cellular communication network 31 if the reception signal strength is weaker than the signal strength threshold, and/or c) determine whether to use the transceiver 13 to relay the data unit to the cellular communication network 31 or not by applying the relaying probability.

The relay devices (relay UEs) 11, 17-19 may use different configurations for different types of data producing devices (remote UEs) or for different slices. These different configurations may be part of the same relay configuration information. As a first example, more relay time windows or a higher relaying probability may be used for public safety slices than for entertainment slices. As a second example, more relay time windows or a higher relaying probability may be used than normal if a remote UE belongs to or is used by an emergency responder.

The system 1 may use the relay configuration information to turn relaying off for a certain relay device, e.g. when it is in a small cell like a femto cell placed in buildings and homes, by configuring the time window to have a zero duration. This would indicate to the relay device that it should not relay data units (because it is in a small cell). In this case the remote devices can either connect directly to the network to transmit their data without using a relay device (so that the relay device can save battery) or relay data via a relay device connected to a large cell nearby.

There are multiple ways in which the time windows for the relay devices could be determined. One (simple) way is to divide one hour by the average number of relay devices available for relaying within a given cell (and perform the same process for all cells). The network then assigns the time slots such that there is always at least one relay device that is relaying data at any point in time.

A more advanced algorithm could take into account the location of the relay devices. By knowing where mobile devices roughly are, e.g. from signal strength measurements or GPS information that the mobile devices transmit, the network could take into account coverage within a cell. The network then splits the cell into 'virtual' spatially co-located subcells that are covered by relay devices. These subcells can be used to group relay devices into groups. If there is more than one relay device in a subcell, the duration of the repeated cycle could be divided by the number of relay devices roughly covering the same area. The network then assigns the time slots such that there is always at least one relay device that is relaying data at any point in time.

Mobility parameters may be taken into account when determining when which relay device should relay. If a relay device is relatively stationary, it may be better suited for relaying than when it is moving quickly. Additionally, a quickly moving relay device could be given a shorter time window, because it will be in another cell soon, whereas a stationary relay device could be given a longer time window because it is more likely to remain present in the same cell for a longer time.

In the embodiment of FIG. 1, the further device 21 broadcasts its data without knowing whether there is a relay device listening to its broadcasts. In an alternative embodiment, the further device 21 may first broadcast a probing message to which a listening relay device may then respond when it is its time window. Relay devices that receive this probing message during their assigned time window will respond to this message stating that they are available for relaying a data unit. The answer may include additional information that is relevant for the further device 21, such as the time window that the further device 21 may use and the network the relay device is connected to such that the further device 21 will know when to transmit its data. Subsequently, the further device 21 will unicast the data unit to the relay device that indicated that it was available and in turn, the relay device will relay the data unit to the network.

In this alternative embodiment, the further device 21 will only transmit data after it has discovered a relay UE (i.e. received a response to its probing message), which will increase the chances of the data being relayed to the network compared to scenarios where the further device 21 simply broadcasts the data. Additionally or alternatively, the relay device may broadcast its presence during its time window (e.g. using a ProSe discovery message) upon which the further device 21 may respond either by transmitting a probing message or by transmitting its data immediately.

A drawback of the latter approach is that if the relay device confirms receipt of the discovery message transmitted by the further device 21, it can still happen that the relay node stops listening soon afterwards (if it adheres strictly to the assigned time window), thereby missing the complete data unit. To avoid this, the relay device may stay in listening mode until a complete data unit from the further device 21 arrives, even if that means extending the relay time window.

If the data unit from the further device 21 arrives within the relay time window of a relay device, the relay time window is not extended. If the data unit from the further device 21 arrives at the end of the scheduled end time of the relay time window of the relay device, then the relay time window is extended until the later of the receipt of the complete data unit from the further device and the expiry of a pre-defined extension time, thereby avoiding the situation that the further device 21 is out of range before finishing its transmission and the relay time window is extended indefinitely. If the received data unit is not complete and a timeout has occurred, the data unit will be dropped. The pre-defined extension time may be a value that is chosen by an operator or defined in a standard. Due to the extension of the relay time window, it may happen that two relay devices receive the same data unit from the further device 21 at the same time.

In the embodiment shown in FIGS. 1 and 2, the system 1 comprises one processor 5. In an alternative embodiment, the system 1 comprises multiple processors. The processor 5 of the system 1 may be a general-purpose processor, e.g. an Intel or an AMD processor, or an application-specific processor, for example. The processor 5 may comprise multiple cores, for example. The processor 5 may run a Unix-based or Windows operating system, for example. The transceiver 3 may use one or more cellular communication technologies such as GPRS, CDMA, UMTS and/or LTE to communicate with the relay devices 11, 17-19, for example. System 1 may comprise other components typical for a component in a mobile communication network, e.g. a power supply. In the embodiment shown in FIGS. 1 and 2, the system 1 comprises one device. In an alternative embodiment, the system 1 comprises multiple devices.

In the embodiment shown in FIGS. 1 and 2, the relay device 11 comprises one processor 15. In an alternative embodiment, the relay device 11 comprises multiple processors. The transceiver 13 of the relay device 11 may use one or more cellular communication technologies such as GPRS, CDMA, UMTS and/or LTE to communicate with the base station 33, for example. The processor 15 may be a general-purpose processor, e.g. an ARM processor, or an application-specific processor. The processor 15 may run Google Android or Apple iOS as operating system, for example. The relay device 11 may comprise other components typical for a relay device, e.g. a display and a battery. The relay device 11 may be a mobile phone, for example.

In the embodiment shown in FIGS. 1 and 2, the further device 21 comprises one processor 25. In an alternative embodiment, the further device 21 comprises multiple processors. The transceiver 23 of the further device 21 may use one or more wireless communication technologies such as LTE (e.g. LTE's PC5 interface) to communicate with the relay devices 11, 17-19, for example. The processor 25 may be a general-purpose processor, e.g. an ARM processor, or an application-specific processor. The processor 25 may run a Unix-based operating system, for example. The further device 21 may comprise other components typical for a device producing data to be relayed, e.g. a sensor and a battery. The further device 21 may be a wearable device, for example.

Figure 3:
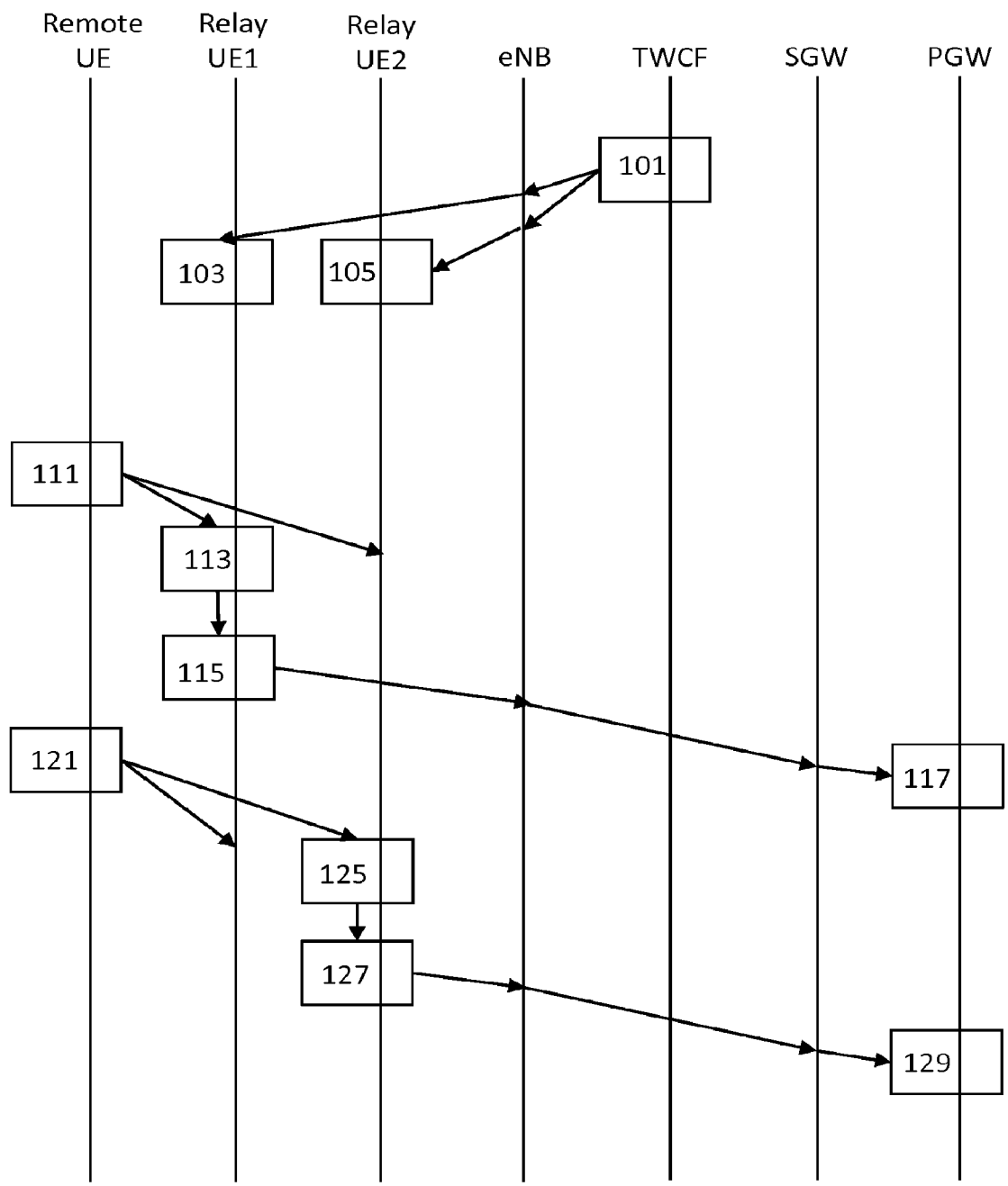
FIG. 3 is a flow diagram of an embodiment of the method of relaying a data unit of the invention.

An embodiment of the method of relaying a data unit is illustrated in FIG. 3. In this embodiment, the method is used in an LTE network with eNodeB (eNB), Serving Gateway (S-GW) and Packet Data Network Gateway (P-GW) functions. In another embodiment, the method is used in a 5G network with the corresponding functions of the 5G network. Two relay UEs are attached to the same eNB.

Step 101 comprises a TWCF (implemented in an embodiment of the system of the invention) transmitting relay configuration to a relay UE1 and a relay UE2. The relay configuration information instructs a device when to receive and/or relay data units and when not to receive and/or relay data units. Steps 103 and 105 comprise the relay UE1 and the relay UE2, respectively, receiving the relay configuration information from the TWCF.

Step 111 comprises a remote UE broadcasting a data unit, e.g. a message. Relay UE1 and UE2 receive the data unit from the remote UE or not in dependence on the relay configuration information. Relay UE2 is not listening for data units to be relayed when the remote UE broadcasts its data unit. Step 113 comprises relay UE1 receiving the data unit from the remote UE. Since relay UE2 did not receive the data unit, it has nothing to relay. In this embodiment, relay UE1 and relay UE2 only listen for data units to be relayed in certain time windows, but relay all data units received in these certain time windows. Step 115 comprises relay UE1 relaying the received data unit to the P-GW via the eNB and the S-GW. Step 117 comprises the P-GW receiving the data unit.

Step 121 comprises the remote UE broadcasting a further data unit. Now, relay UE1 is not listening for data units to be relayed when the remote UE broadcasts its further data unit. Step 125 comprises relay UE2 receiving the further data unit from the remote UE. Since relay UE1 did not receive the further data unit, it has nothing to relay. Step 127 comprises relay UE2 relaying the received further data unit to the P-GW via the eNB and the S-GW. Step 129 comprises the P-GW receiving the further data unit. In an alternative embodiment, the data unit and/or the further data unit are not transmitted to the P-GW, but to a third-party interface like the Service Capability Exposure Function (SCFE).

Figure 4:
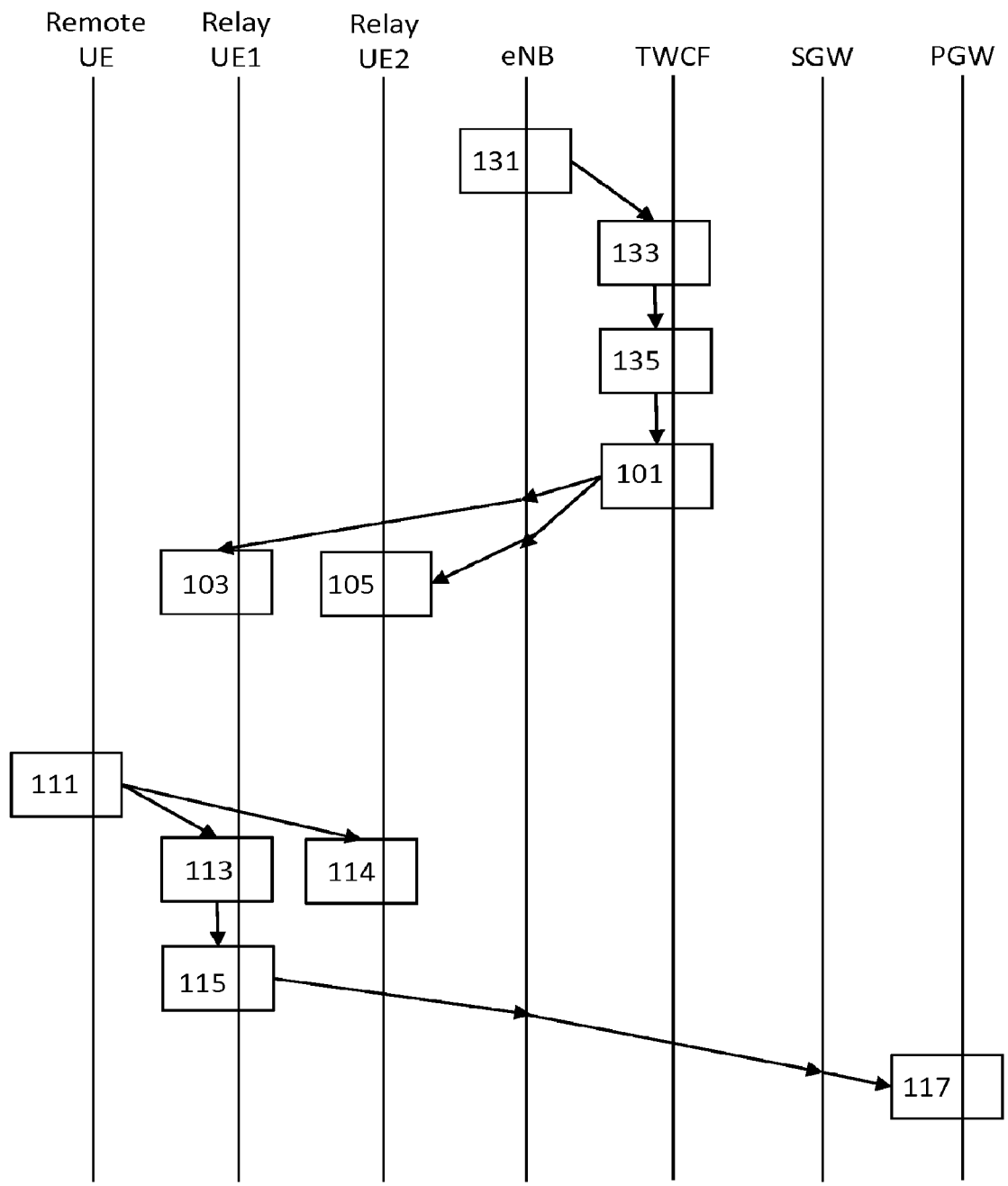
FIG. 4 is a flow diagram of a first embodiment of the method of determining a relay configuration of the invention.

An embodiment of the method of determining a relay configuration is illustrated in FIG. 4. Steps 131, 133 and 135 are performed before the TWCF transmits the relay configuration information to relay UE1 and relay UE2 in step 101 (which is the first step shown in FIG. 3). Step 131 comprises the eNB transmitting information relating to relay devices present in a certain spatial area, e.g. in one or more of the cells that it is serving, in this case relay UE1 and relay UE2, to the TWCF. Step 133 comprises the TWCF receiving this information. The TWCF may have requested this information or the eNB may have transmitted this information on its own initiative. Step 135 comprises the TWCF determining the relay configuration information for relay UE1 and relay UE2 from the received information. In an alternative embodiment, the TWCF receives this information from a ProSe server, estimates it from previously received information or receives it from a human-operated terminal.

In the example shown in FIG. 4, both relay UE1 and relay UE2 receive the data unit transmitted by the remote UE in step 111. In step 113, the relay UE1 receives the data unit transmitted by the remote UE. In step 114, the relay UE2 receives the data unit transmitted by the remote UE. In this embodiment, relay UE1 and relay UE2 only listen for data units to be relayed in certain time windows and relay the received data unit to the eNB or not in dependence on the relay configuration information, e.g. a probability or signal strength threshold determined from the relay configuration information.

In another embodiment, relay UE1 and relay UE2 listen for data units to be relayed all the time. This is beneficial when different priorities are assigned to different remote UEs or to different slices transmitted by remote UEs. For example, data units from certain high priority UEs (e.g. used for ensuring public safety) may be relayed at all times (thereby overruling the relay time window for these UEs), while data units from regular UEs may not be relayed in the further time window (thereby conforming to the relay time window) in order to decrease the number of duplicate data units.

Step 115 comprises relay UE1 relaying the received data unit to the SGW via the eNB. Step 117 comprises the SWG receiving the data unit. Relay UE2 does not relay the received data unit, e.g. because the received signal strength was below the signal strength threshold or because the relay probability was 0.25 and relay UE2 randomly picked one of the numbers 1-3 instead of the number 0. Assigning a first set of numbers to the decision "relay" ({0} in this example) and a second set of numbers to the decision "not relay" (({1,2,3}) in this example), the size of the first set divided by the size of the second set being equal to the relay probability, is one way of implementing the application of the relay probability.

Figure 5:
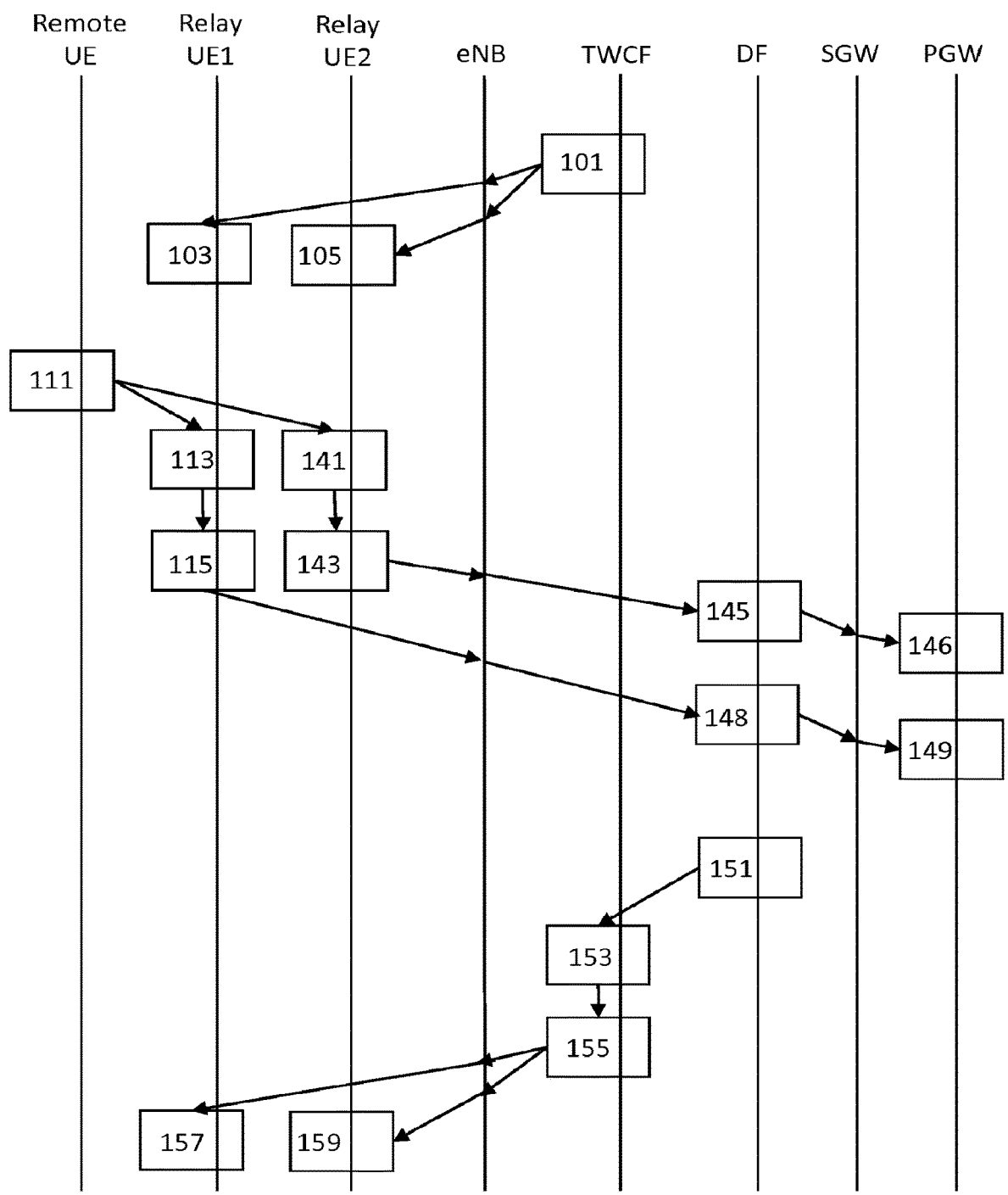
FIG. 5 is a flow diagram of a second embodiment of the method of determining a relay configuration of the invention.

FIG. 5 illustrates a further embodiment of the method of determining a relay configuration. In this embodiment, the TWCF determines the relay configuration information for the relay devices based on a count of duplicate data units originating from the certain spatial area. In this embodiment, the number of duplicates is counted by a new function called the Deduplication Function (DF), which removes duplicates as well as counts them. In another embodiment, duplicates are not removed. The DF and TWCF may be combined in one system and/or the DF and eNB may be combined in one system, for example.

Just like with the TWCF, the DF can be either centralized (one for the whole network, or one per larger group of eNBs) or decentralized. If decentralized, the DF could be collocated with eNBs in a standalone fashion (every DF does its own deduplication) or in a distributed fashion (every DF collaborates with other DFs). DF could also sit at a higher level, e.g. at the level of the P-GW or at an intermediate level, e.g. between the P-GW and the eNB.

The DF can be implemented by using a sequence number and a remote UE identifier (unique ID) in the data units, e.g. messages, that are transmitted by the remote UE. If a DF finds a data unit from the same remote UE with a sequence number that has already been received before, that data unit is identified as a duplicate and discarded. For this to work, data units received by multiple relay UEs have to pass through the same DF.

In the example shown in FIG. 5, both relay UE1 and relay UE2 receive the data unit transmitted by the remote UE in step 111. In step 113, the relay UE1 receives the data unit transmitted by remote UE. In step 141, the relay UE2 receives the data unit transmitted by remote UE. Furthermore, both relay UE1 and relay UE2 relay the data unit to the P-GW via the eNB and the S-GW in steps 115 and 143, respectively. When the data unit is relayed, it is received by the DF in steps 148 and 145, respectively, before being received by the P-GW in steps 149 and 146, respectively.

The DF records how many duplicates of a data unit, e.g. message, produced by a remote UE have been received by the DF. This parameter is referred to as D-factor (duplication factor) in this specification. The D-factor indicates how well the TWCF algorithm or configuration performs. In this case, the DF records that the same data unit has been relayed twice.

Figure 6:
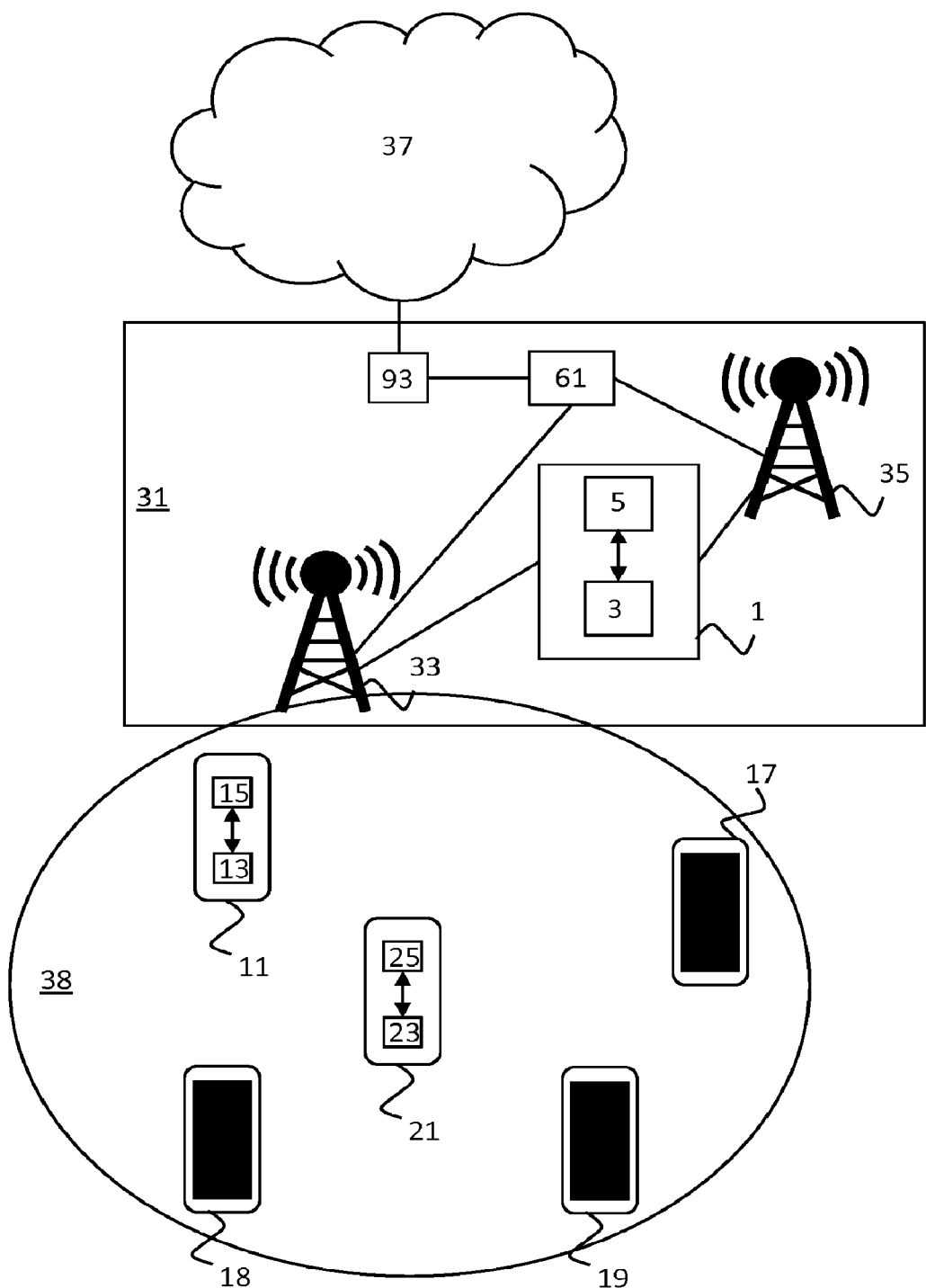
FIG. 6 is a block diagram of a third embodiment of the system, a data duplication function at a first location and the devices of FIG. 1.
Figure 7:
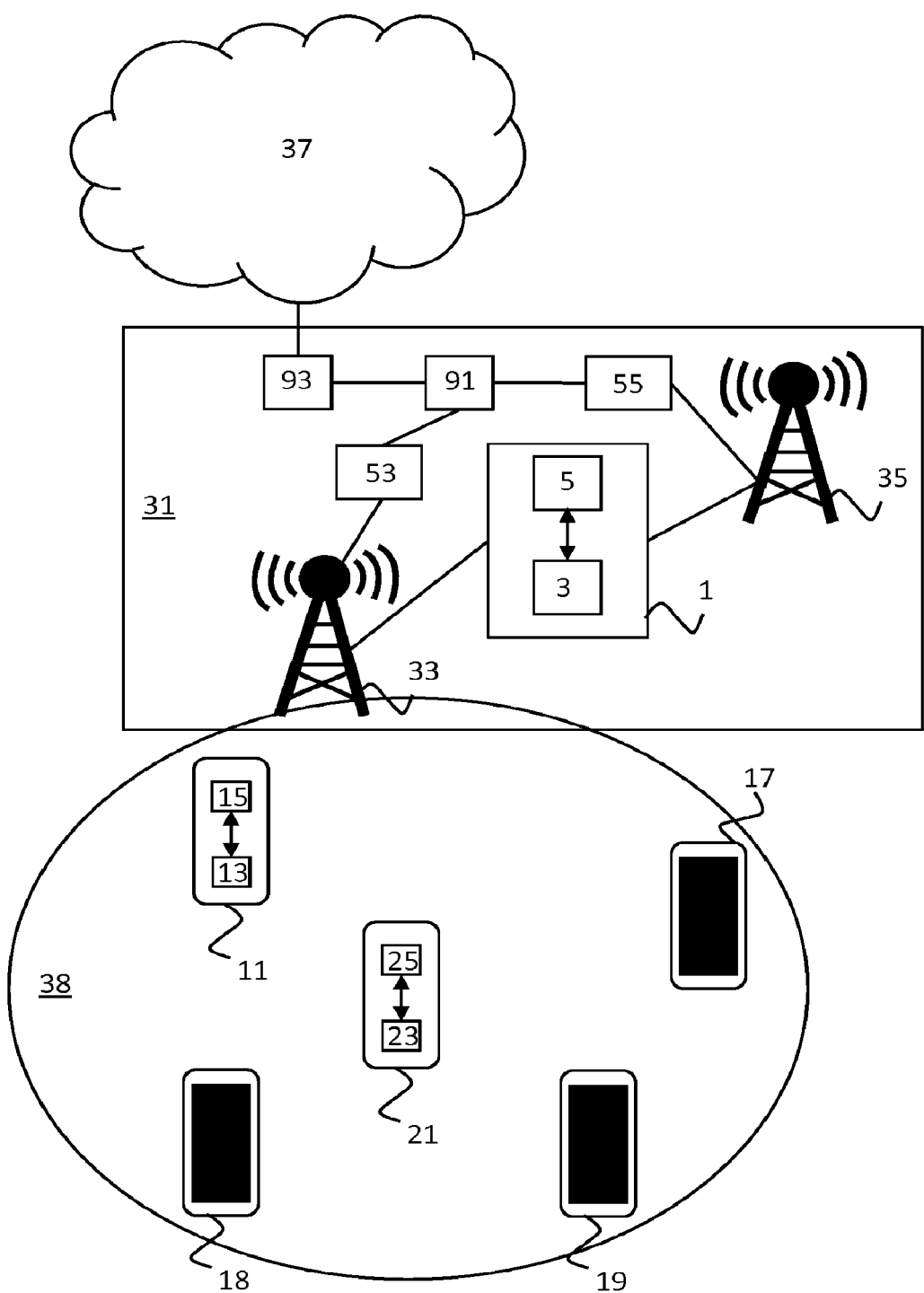
FIG. 7 is a block diagram of the third embodiment of the system, a data duplication function at a second location and the devices of FIG. 1.

The scope of the duplicate detection depends on where in the network the DF is located. In one possible implementation, the DF is placed higher up in the network (e.g. at a P-GW), where all data units pass through regardless of mobility. This is illustrated in FIG. 6, where the DF and the S-GW are collocated in DF/S-GW 61. In another possible implementation, the DF is associated with one or a few eNBs. This is illustrated in FIG. 7, where DF 53 is placed between base station 33 and the S-GW 91 and DF 55 is placed between base station 35 and the S-GW 91. To make sure that duplicate data units can be identified it is necessary for the remote UE to specify which eNB it has an association with, as it is possible for a broadcast data unit to be received by multiple relay UEs which are connected to different eNBs. The remote UE should therefore add an eNB identifier to the data unit for the eNB with which it has an association. Other eNBs which receive this data unit are then able to relay the data unit to the correct eNB. The DF at this eNB can then perform the deduplication.

The D-factor is used by the TWCF to take appropriate action by changing one or more configuration parameters. For example, a network that is designed not to cause any duplications (which will likely result in data units being lost) may be configured such that the D-factor should stay close to 1 (meaning no duplications). In practice, this means that the network will send relay configuration information with which relay devices in a certain spatial area are assigned non-overlapping or at least minimally overlapping time windows in order to structurally avoid duplication.

In step 151 of FIG. 5, the DF transmits the D-factor to the TWCF, either on request or on its own initiative. In an alternative embodiment, the DF does not transmit the D-factor, but signals that the number of duplicates is too high or too low (or optionally that the number of duplicates is okay).

In step 153, the TWCF determines the relay configuration information for relay UE1 and relay UE2 based on the D-factor and transmits the relay configuration information to relay UE1 and relay UE2 in step 155. In steps 157 and 159, respectively, relay UE1 and relay UE2 receive the relay configuration information.

As another example, the D-factor target can be set to 2 (i.e. 2 received data units of which 1 duplication) in a network or in a part of a network that is designed for reliable transport. If the goal is to achieve reliable delivery of remote UE data, the time windows assigned to individual relay UEs do not have to be exclusive for exactly one relay UE, but two or more relay UEs may be configured to receive data units at the same time. In this case, the DF will provide feedback to the TWCF whenever the D-factor deviates too much from the D-factor target so that the TWCF can adjust its parameters. This is advantageous in a highly dynamic environment in which there is a relatively large number of UEs entering and leaving the coverage area in a short time frame.

In an embodiment, the D-factor target is chosen such that no immediate action is required most of the time and a new configuration is only required whenever the D-factor drops too low. For example, the DF may be configured with an ideal D-factor of 2 and two threshold values of, for example, 1.5 and 2.5. As long as the D-factor is between these limits, the DF will do nothing. For a DF that is collocated with an eNB and that calculates the D-factor locally, there is another advantage: as the D-factor is calculated on a per eNB basis, the TWCF can change configuration settings per eNB.

In the embodiments of FIGS. 3 to 5, the relay configuration information comprises a start time and an end time for listening for and/or relaying data units and/or comprises information instructing a relay device to start listening for and/or relaying data units immediately. The relay configuration may further comprise a signal strength threshold above which said relay device should relay a data unit and below which said relay device should not relay said data unit and/or a relaying probability which said relay device should apply to determine whether to relay said data unit or not. These last two parameters are especially advantageous when used together with the DF and the DF enables these last two parameters to be used without any of the first two parameters (i.e. the parameters which allow relay UEs to determine time windows).

The signal strength threshold tells the relay UE to only relay a data unit if the signal strength is above a certain threshold. This configuration message contains the minimum signal strength a signal comprising a data unit must have for it to be relayed by the relay UE. In denser areas, this threshold will be higher than in less dense areas. As a result, only the one or more relay UEs which are closest to the remote UE will relay the data unit broadcast by the remote UE. This saves battery power for the relay UE since it only has to react to sufficiently strong signals that are easier to decode error free.

The signal strength threshold may be increased or decreased depending on the number of duplicate data units detected by the network. The relay UE may periodically provide as feedback to the network how many data units were received in signals that had a signal strength lower than the threshold. This allows the network to increase the signal strength threshold when too many duplicate data units are counted and decrease the signal strength threshold when too few duplicate data units are counted and/or too many data units were received in signals with a signal strength lower than the threshold (and therefore dropped), for example The relay probability is the probability with which the device relays a particular received data unit. For example, if the relay probability is 0.25, the goal is to have on average 1 out of each 4 received data units relayed. The relaying probability may be increased or decreased depending on the number of duplicate data units detected by the network. The same relaying probability may be given to each relay UE in the same spatial area, or different relay UEs may be given different relaying probabilities, for example. In the latter case, the relaying probability may depend on the battery levels of the relay UEs and/or the network rate supported by the relay UEs, for example. The relay UEs may transmit this information to the network.

The advantage of using parameters in addition to time windows is that the eNB could change these parameters with a broadcast message to all relay UEs within reach. This makes the process of reconfiguration less signaling intensive and allows the eNB to quickly react in cases the D-factors change rapidly. These changes will typically only have effect locally. Additionally or alternatively, the relay configuration information may include parameters other than the parameters previously described.

Figure 8:
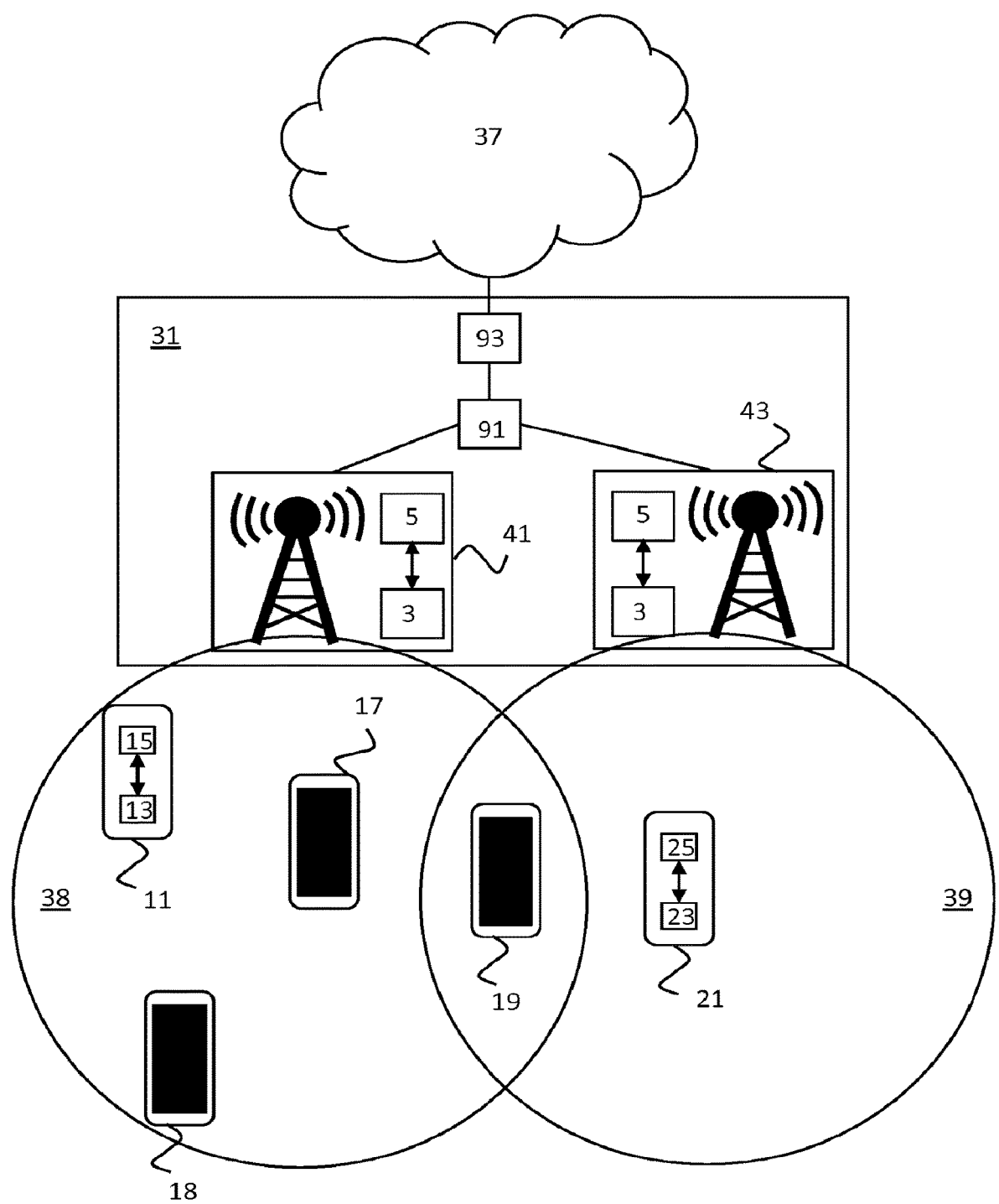
FIG. 8 depicts a data producing device which receives a broadcast configuration from a first system and is located near a relay device which receives a relay configuration from a second system.

As shown in FIG. 2, in one embodiment of the system, every eNB has its own TWCF. As shown in FIG. 1, in another embodiment of the system, the TWCF sits on a higher level in such a way that the coverage area of the TWCF spans the coverage area of multiple eNBs. The consequence of the embodiment of FIG. 2 is that a relay UE may be on the edge of the coverage area of two eNBs, but may also be on the edge of the coverage area of two TWCFs (e.g. in the overlapping part of coverage areas 38 and 39). The relay UE could then receive instructions from one TWCF, but receive broadcasts from a remote UE in another TWCF coverage area, as is shown in FIG. 8.

This may be solved by letting TWCFs take into account the neighboring TWCFs. This could be implemented without the TWCF needing to receive any configuration information from the neighboring TWCFs. TWCFs may simply assign a lower relay probability to a relay UE on a TWCF border. Relay UEs that are within reach of two eNBs only listen during the time window configured by the TWCF of the eNB that they are connected to. Alternatively or additionally, the coverage area of the DF may be chosen in such a way that it is has a larger coverage than the TWCFs and can detect duplicates across TWCF borders. For example, there may be one DF for a whole network.

In the embodiments of FIGS. 1-2 and 6-8, the further device 21 (remote UE) might be a conventional device. Alternatively, the further device 21 may be specially configured. The processor 25 of the further device 21 may be configured to use the transceiver 23 to receive broadcast configuration information established by the cellular communication network 31, determine a transmission time window and/or a transmission power for broadcasting data units to be relayed from the broadcast configuration information, and use the transceiver 23 to broadcast the data units in the transmission time window and/or at the transmission power. Thus, the further device 21 may be configured to perform the method of broadcasting data units to be relayed of the invention.

Figure 9:
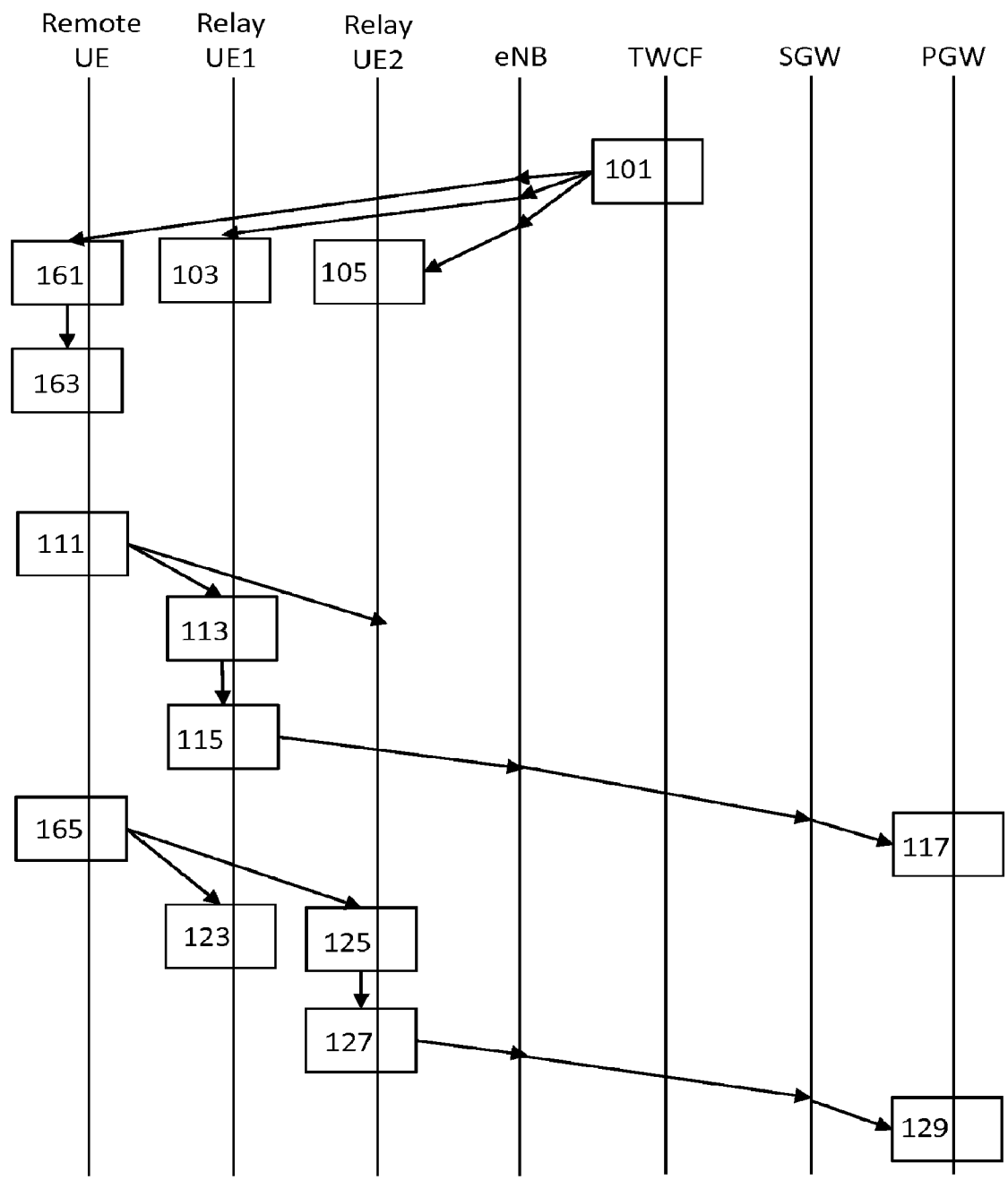
FIG. 9 is a flow diagram of an embodiment of the method of broadcasting data units to be relayed of the invention.

An embodiment of the method of broadcasting data units to be relayed is shown in FIG. 9. Compared to the method of FIG. 3, the method of FIG. 9 comprises additional steps 161, 163 and 165 and the configuration information is transmitted by the TWCF to the relay UE as well in step 101. Step 161 comprises the remote UE receiving broadcast configuration information established by the TWCF. Step 163 comprises the remote UE determining a transmission time window for broadcasting data units to be relayed from the broadcast configuration information. In an alternative embodiment, step 163 alternatively or additionally comprises the remote UE determining a transmission power for broadcasting data units to be relayed from the broadcast configuration information.

Step 165 comprises the remote UE broadcasting the data units in the transmission time window. In an alternative embodiment, step 165 alternatively or additionally comprises the remote UE broadcasting the data units at the transmission power. By broadcasting the data units in the transmission time window, the number of transmission collisions with other remote UEs may be reduced. By broadcasting the data units at the specified transmission power, it may be possible to achieve a D-factor that is close to the target D-factor or closer to the target D-factor than would otherwise be possible.

In case the network provides both the relay UE and the remote UE with a time window, more advanced algorithms may be possible and needed. For example, in areas with low density of remote UEs, the TWCF could assign all the remote UEs the same time windows. Whenever the density goes up, the network could diversify the time windows by making more time windows available and assigning those to remote UEs. Alternatively, the network could assign particular time windows to more stationary UEs and other time windows to highly mobile UEs. That way, the network will avoid collisions with stationary UEs. For mobile UEs, collisions may be more acceptable since they will move to another area soon and can retry there. The network could then match the time windows assigned to particular remote UEs with time windows assigned to the relay UEs. This way, a 'sparse' assignment is obtained with times when there are no UEs listening and/or broadcasting and times when specific UEs are listening and broadcasting.

In case the network transmits a transmission power (configuration) to remote UEs (e.g. broadcast at regular intervals), the network may determine the specific value of the transmission power per cell based on the number of duplications which reach the network (e.g. the DF). The transmission power may be increased to try to increase the number of duplicate data units (and thereby the reliability of the relay function). The transmission power may be decreased to try to decrease the number of duplicate data units. If the transmission power is too high, the number of relay UEs which receive broadcasts is high, and therefore a large number of duplicate data units will be received by the network. The TWCF or a function similar to the TWCF (which may be collocated with one or more other functions) may determine the configurations for transmission power levels of remote UEs and/or signal reception thresholds for relay UEs (based on DF results).

In an embodiment, the remote UEs are divided in groups. For example, there might be a 'high priority' group that receives more time windows, thereby providing some guarantee or higher probability that data units will get through. Additionally, there might be a 'best effort' group that receives a particular 'best effort' time window that provides no guarantee or a lower probability that data units will get through. Depending on the subscription, remote UEs could be in one of the groups. Relay UEs in turn are told that all data units received in particular time windows should be relayed, whereas for other time windows only a certain percentage should be relayed or even that listening during some particular time windows is optional.

If it is not possible to limit the number of relay UE transmission collisions (sufficiently), acknowledgements may be beneficial. In the previously described embodiments, it is assumed that transmission of a data unit is not acknowledged or is acknowledged at TCP protocol level. Alternatively, the network could send out an acknowledgement via the broadcast channel which may be received by the remote UE. The network could do so once it has received the data unit from the remote UE. As another alternative, the relay UE could send an acknowledgement to the remote UE telling it that it has received the data unit and will relay it, or telling it that it has received the data unit and has successfully relayed it to the network. In this case, the relay UE may actually forward an acknowledgement from the network to the remote UE. This acknowledgement could then also contain new configuration parameters (if deemed necessary by the network) for the remote UE.

Figure 10:
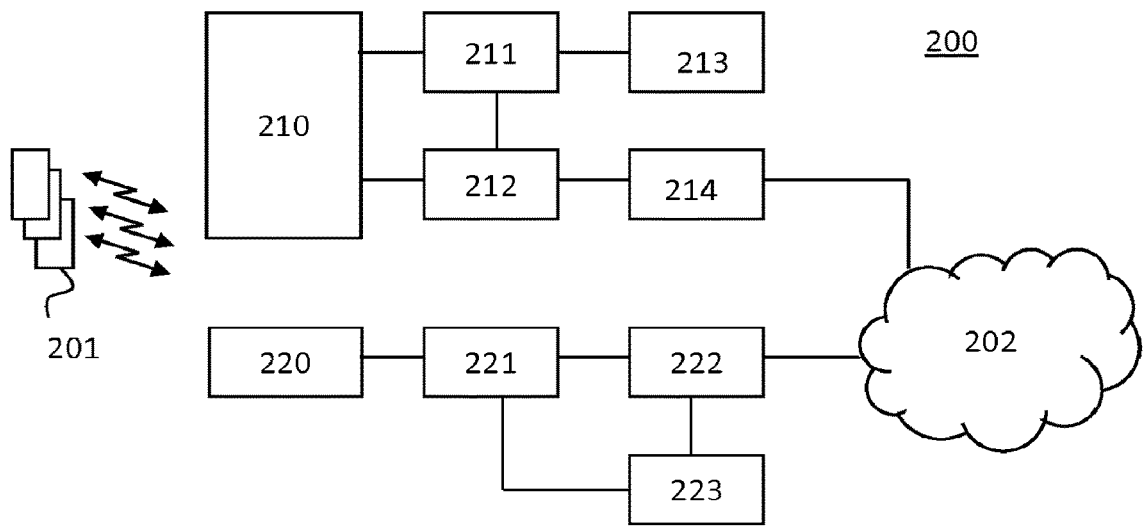
FIG. 10 is a block diagram of an exemplary cellular telecommunication system used in an embodiment of the device and the system of the invention.

In the telecommunications system 200 of FIG. 10, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 10 represents a GSM/GPRS or UMTS network.

For a GSM/GPRS network, a radio access network (RAN) system 220 comprises a plurality of nodes, including base stations (combination of a BSC and a BTS), not shown individually in FIG. 10. The core network system comprises a Gateway GPRS Support Node 222 (GGSN), a Serving GPRS Support Node 221 (SGSN, for GPRS) or Mobile Switching Centre (MSC, for GSM, not shown in FIG. 5) and a Home Location Register 223 (HLR). The HLR 223 contains subscription information for user devices 201, e.g. mobile stations MS.

For a UMTS radio access network (UTRAN), the radio access network system 220 also comprises a Radio Network Controller (RNC) connected to a plurality of base stations (NodeBs), also not shown individually in FIG. 10. In the core network system, the GGSN 222 and the SGSN 221/MSC are connected to the HLR 223 that contains subscription information of the user devices 201, e.g. user equipment UE.

The upper branch of the telecommunications system in FIG. 10 represents a next generation network, commonly indicated as Long Term Evolution (LTE) system or Evolved Packet System (EPS).

The radio access network system 210 (E-UTRAN), comprises base stations (evolved NodeBs, eNodeBs or eNBs), not shown individually in FIG. 10, providing cellular wireless access for a user device 201, e.g. user equipment UE. The core network system comprises a PDN Gateway (P-GW) 214 and a Serving Gateway 212 (S-GW). The E-UTRAN 210 of the EPS is connected to the S-GW 212 via a packet network. The S-GW 212 is connected to a Home Subscriber Server HSS 213 and a Mobility Management Entity MME 211 for signalling purposes. The HSS 213 includes a subscription profile repository SPR for user devices 201.

For GPRS, UMTS and LTE systems, the core network system is generally connected to a further packet network 202, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 11:
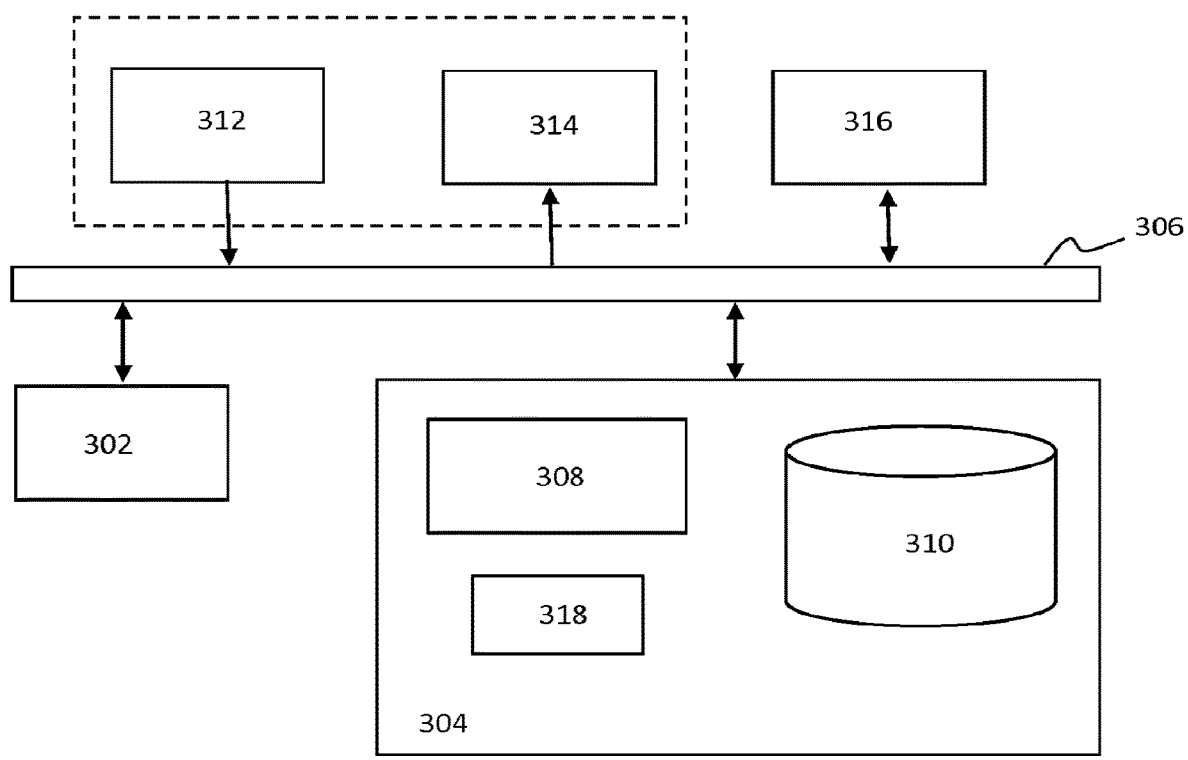
FIG. 11 is a block diagram of an exemplary data processing system for performing the methods of the invention.

FIG. 11 depicts a block diagram illustrating an exemplary data processing system that may perform the methods as described with reference to FIGS. 3-5 and FIG. 9.

As shown in FIG. 11, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 11, the memory elements 304 may store an application 318. In various embodiments, the application 318 may be stored in the local memory 308, he one or more bulk storage devices 310, or separate from the local memory and the bulk storage devices. It should be appreciated that the data processing system 300 may further execute an operating system (not shown in FIG. 11) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A device for relaying a data unit, the device comprising:
   at least one receiver;
   at least one transmitter; and
   at least one processor configured to:
   use the at least one receiver to receive relay configuration information from a cellular communication network, the relay configuration information instructing the device to listen for data units immediately and further instructing the device whether or not to relay received data units to the cellular communication network, and use the at least one receiver to receive a data unit from a further device and use the at least one transmitter to relay a received data unit to the cellular communication network or not in dependence on the relay configuration information.

2. The device as claimed in claim 1, wherein the at least one processor is configured to decide whether or not to relay the received data unit in dependence on a relay time window, a signal strength threshold and/or a relaying probability determined from the relay configuration information.

3. The device as claimed in claim 2, wherein the at least one processor is configured to use the at least one transmitter to relay the data unit to the cellular communication network if the data unit was received in the relay time window and not relay the data unit if the data unit was received in a further time window outside the relay time window.

4. The device as claimed in claim 2, wherein the at least one processor is configured to receive the data unit from the further device in a signal at a reception signal strength, use the at least one transmitter to relay the data unit to the cellular communication network if the reception signal strength is stronger than the signal strength threshold and not relay the data unit to the cellular communication network if the reception signal strength is weaker than the signal strength threshold.

5. The device as claimed in claim 2, wherein the at least one processor is configured to determine whether to use the at least one transmitter to relay the data unit to the cellular communication network or not by applying the relaying probability.

6. A system for determining a relay configuration, comprising:
at least one receiver;
at least one transmitter; and
at least one processor configured to:
use the at least one receiver to receive information relating to relay devices present in a certain spatial area,
determine relay configuration information for the relay devices from the information, the relay configuration information instructing the relay devices to listen for data units immediately and further instructing the relay devices whether or not to relay received data units, and
use the at least one transmitter to transmit the relay configuration information to the relay devices.

7. A system for determining a relay configuration, comprising:
at least one receiver;
at least one transmitter; and
at least one processor configured to:
use the at least one receiver to receive information relating to relay devices present in a certain spatial area,
determine from the information how many relay devices are present in the certain spatial area,
determine relay configuration information for the relay devices based on how many relay devices are present in the certain spatial area, the relay configuration information instructing the relay devices to listen for data units immediately and further instructing the relay devices whether or not to relay received data units,
use the at least one transmitter to transmit the relay configuration information to the relay devices.

8. The system as claimed in claim 6, wherein the relay configuration information comprises a start time and an end time for relaying data units, comprises information instructing a relay device to start relaying data units immediately, comprises a signal strength threshold above which the relay device should relay a data unit and below which the relay device should not relay the data unit and/or comprises a relaying probability which the relay device should apply to determine whether to relay the data unit or not.

9. The system as claimed in claim 6, wherein the at least one processor is configured to determine the relay configuration information for the relay devices based on a count of duplicate data units originating from the certain spatial area.

10. The system as claimed in claim 9, wherein a number of duplicate data units is counted by a Deduplication Function which is further configured for providing the number to the system, and for removing the duplicate data units.

11. The system as claimed in claim 8, wherein the at least one processor is further configured to determine the start time and the end time for relaying data units based on location of the relay devices, type of location of the relay devices, mobility parameters of the relay devices and/or battery level of the relay devices.

12. A device for broadcasting data units to be relayed, comprising:
at least one receiver;
at least one transmitter; and
at least one processor configured to:
use the at least one receiver to receive broadcast configuration information established by a cellular communication network,
determine a transmission time window and/or a transmission power for broadcasting data units to be relayed from the broadcast configuration information, and
use the at least one transmitter to broadcast the data units in the transmission time window and/or at the transmission power.

13. The device as claimed in claim 12, wherein the at least one processor is further configured to use the at least one receiver to receive an acknowledgement that the data unit has been received.

14. The device as claimed in claim 12, wherein the at least one processor is further configured to
use the at least one transmitter to first broadcast a probing message,
use the at least one receiver to receive a response to the probing message from a relay device, the response stating that the relay device is available for relaying data units,
use the at least one transmitter to unicast the data units to the relay device in the transmission time window and/or at the transmission power.

15. A method of relaying a data unit, comprising:
receiving relay configuration information from a cellular communication network, the relay configuration information instructing a device to listen for data units immediately and further instructing the device whether or not to relay received data units to the cellular communication network; and
receiving a data unit from a further device and relaying a received data unit to the cellular communication network or not in dependence on the relay configuration information.

16. A method of determining a relay configuration, comprising:
    receiving information relating to relay devices present in a certain spatial area;
    determining relay configuration information for the relay devices from the information, the relay configuration information instructing the relay devices to listen for data units immediately and further instructing the relay devices whether or not to relay received data units; and
    transmitting the relay configuration information to the relay devices.

17. A method of broadcasting data units to be relayed, comprising:
    receiving broadcast configuration information established by a cellular communication network;
    determining a transmission time window and/or a transmission power for broadcasting data units to be relayed from the broadcast configuration information; and
    broadcasting the data units in the transmission time window and/or at the transmission power.

18. A non-transitory computer-readable medium having instructions stored thereon for relaying a data unit, wherein the instructions, when executed by one or more processors, cause the one or more processors to carry out operations including:
    receiving relay configuration information from a cellular communication network, the relay configuration information instructing a device to listen for data units immediately and further instructing the device whether or not to relay received data units to the cellular communication network; and
    receiving a data unit from a further device and relaying a received data unit to the cellular communication network or not in dependence on the relay configuration information.

19. A non-transitory computer-readable medium having instructions stored thereon for determining a relay configuration, wherein the instructions, when executed by one or more processors, cause the one or more processors to carry out operations including:
    receiving information relating to relay devices present in a certain spatial area;
    determining from the information how many relay devices are present in the certain spatial area;
    determining relay configuration information for the relay devices from the information based on how many relay devices are present in the certain spatial area, the relay configuration information instructing a relay device to listen for data units immediately and further instructing the relay device whether or not to relay received data units to the cellular communication network; and
    transmitting the relay configuration information to the relay devices.

20. A non-transitory computer-readable medium having instructions stored thereon for broadcasting data units to be relayed by a relay device, wherein the instructions, when executed by one or more processors, cause the one or more processors to carry out operations including:
    receiving broadcast configuration information established by a cellular communication network;
    determining a transmission time window and/or a transmission power for broadcasting data units to be relayed from the broadcast configuration information; and
    broadcasting the data units in the transmission time window and/or at the transmission power.

21. A system comprising:
    a relay-configuration determining system of a cellular communication network;
    a relaying device; and
    a broadcasting device;
    wherein the relay-configuration determining system is configured to:
        use a receiver of the relay-configuration determining system to receive information relating to relay devices present in a certain spatial area,
        determine relay configuration information for the relay devices, including the relaying device, from the information, the relay configuration information instructing the relay devices to listen for data units immediately and further instructing the relay devices whether or not to relay received data units, and
        use a transmitter of the relay-configuration determining system to transmit the relay configuration information to the relay devices, including to the relaying device;
    wherein the relaying device is configured to:
    use a receiver of the relaying device to receive the relay configuration information from the relay-configuration determining system, and
    use the receiver of the relaying device to receive a data unit from a further device, including the broadcasting device, and use a transmitter of the relaying device to relay a received data unit to the cellular communication network or not in dependence on the relay configuration information;
    and wherein the broadcasting device is configured to:
        use a receiver of the broadcasting device to receive broadcast configuration information established by the cellular communication network,
        determine a transmission time window and/or a transmission power for broadcasting data units to be relayed from the broadcast configuration information, and
        use a transmitter of the broadcasting device to broadcast the data units in the transmission time window and/or at the transmission power.

* * * * *